United States Patent Office 3,377,388
Patented Apr. 9, 1968

3,377,388
PREPARATION OF SATURATED, UNSATU-
RATED AND HYDROXY FATTY ALCO-
HOLS BY HYDROGENATION
Amirapu J. Pantulu, Kongandra Thammu Achaya, Gurbachan S. Sidhu, and Syed H. Zaheer, Hyderabad, India, assignors to Council of Scientific and Industrial Research, New Delhi, India, an Indian corporation
No Drawing. Filed Apr. 5, 1965, Ser. No. 445,737
4 Claims. (Cl. 260—638)

ABSTRACT OF THE DISCLOSURE

High yields of fatty alcohols are obtained from the corresponding fatty acids. A mixture of a fatty acid containing about 3 percent of a copper-cadmium soap catalyst, the soap being of the same fatty acid and the ratio of copper to cadmium being about 2:1, is heated to a temperature of between 200° and 220° C. while in a hydrogen atmosphere maintained at a pressure of between 3500 and 3800 lbs. p.s.i. The fatty acid is reduced resulting in high yields of the corresponding fatty alcohol.

This invention relates to the preparation of fatty alcohols by hydrogenation.

It has already been proposed to prepare fatty alcohols by the hydrogenolysis of fatty esters and glycerides, using specially prepared copper chromite as a catalyst. Such a process suffers from various drawbacks such as those briefly referred to below:

(a) When glycerides are used as raw materials for hydrogenolysis valuable glycerol is lost by conversion to other products; and for using fatty esters as the starting materials, such esters have to be specially prepared, which involves an additional operation.

(b) The catalyst copper chromite is difficult to prepare, as its preparation involves numerous steps. Moreover, its efficiency varies from batch to batch on account of small differences that are unavoidable in its preparation.

(c) The reaction takes a long time for completion and this leads to undesirable side reactions.

(d) A high temperature has to be maintained during the reaction, and this also contributes to the formation of undesirable products.

This invention has for its object an improved process whereby these drawbacks may be reduced very considerably, if not altogether eliminated.

With this object in view, this invention consists of an improved process for the preparation of a fatty alcohol, which process consists in subjecting a fatty acid to hydrogenation in the presence of a catalyst.

The fatty acid used may be a commercial product.

A suitable catalyst for carrying out the said improved process is a copper salt, i.e. copper soap of the fatty acid which is subjected to hydrogenation. The said copper salt may be prepared by any well known method.

The said hydrogenation may be carried out at a pressure of about 3500 to 3800 p.s.i.

The time taken for the reaction is about 20 minutes.

When a saturated or an unsaturated fatty acid is subjected to hydrogenation in the presence of a copper salt of said acid, the product obtained is a saturated fatty alcohol; but if it is desired that by the hydrogenation of an unsaturated fatty acid the product obtained should be an unsaturated fatty alcohol, this can be ensured by using a catalyst comprising a mixture of copper and cadmium soaps of the said fatty acid, instead of a copper soap by itself, the said catalyst having a copper to cadmium metal weight ratio of 2:1.

For obtaining a saturated alcohol, the reaction is carried out at a temperature of about 250° C.; and for obtaining an unsaturated alcohol, it may be carried out at a lower temperature of about 200°–220° C.

The following examples are intended to illustrate this invention and are not to be construed as limiting the same.

Example 1

*Saturated fatty alcohols.*—To the fatty acid, e.g. stearic, is added the copper soap catalyst to give a concentration of metallic copper of one percent, and the mass charged into a high-pressure hydrogenolysis unit, and sealed gas-tight. The bomb is first flushed with hydrogen gas and further gas pumped in from a hydrogen booster till the pressure is built up to a point where, after rapid heating to 250° C., and agitation by rocking, the final pressure will be 3800 p.s.i.

The hydrogen absorption is extremely rapid, usually being complete in about 20 minutes. When the pressure falls to a steady level, the heating is cut off and after cooling, the pressure released and the charge worked up. A typical crude product had: hydroxyl value 199 (Calc. 208), saponification value 4.9 (Calc. Nil) and acid value Nil (Calc. Nil), and thus consisted of about 90 percent of stearyl alcohol, which can be purified by vacuum distillation.

Example 2

*Oleyl alcohol.*—By the procedure of the foregoing example, oleic acid was hydrogenated using as catalyst a total of 3 percent (metal concentration) of copper-cadmium catalyst in a metal weight ratio of 2:1. The temperature was kept at 220° and the initial hydrogen pressure was developed to 3800 p.s.i.. The crude product obtained had hydroxyl value 190, saponification value 9.4 and I.V. 85.0. Distillation under reduced pressure gave oleyl alcohol of hydroxyl value 211 (Calc. 210), saponification value Nil, acid value Nil, Iodine value 84.1 (Calc. 94.7) and refractive index at 25° C. 1.4579.

Example 3

*Ricinoleyl alcohol.*—Following the procedure described in Example 1, mixed fatty acids of castor oil (90% ricinoleic acid) of hydrogenation at 220° C. and a maximum hydrogen pressure of 3800–4000 p.s.i. using 3 percent of the mixed metal catalyst in the copper-cadmium metal weight ratio of 2:1, afforded ricinoleyl alcohol. A typical product analysed to: hydroxyl value 306, saponification value 20, iodine value 76, which on fractional vacuum distillation yielded 10 percent of a mixture of lower alcohols, 65 percent of mainly ricinoleyl alcohol, 15 percent of ricinoleyl ricinoleate and 10 percent of polymerised residue.

The improved process according to the invention, has, as compared with the processes previously proposed, important advantages such as those mentioned below:

(i) The raw products required are available as commercial products.

(ii) It enables the direct preparation of an unsaturated fatty alcohol by the use of an unsaturated fatty acid as the raw material and a catalyst comprising a mixture of copper and cadmium soaps.

(iii) The catalyst used can be easily prepared and are highly reproducible in quality.

(iv) The reaction time is considerably reduced.

(v) The reaction may be carried out at a lower temperature.

What we claim is:

1. An improved process for the preparation of unsaturated fatty alcohols comprising preparing a mixture of an unsaturated fatty acid and a catalyst, said catalyst comprising the copper and cadmium soaps of said fatty acid, the ratio of said copper to cadmium metals being 2:1, and heating said mixture to a temperature between 200° and 220° C., while maintaining said mixture under a hydrogen atmosphere at a pressure between 3500 and 3800 p.s.i.

2. The process as claimed in claim 1 wherein said mixture includes about 3 percent by weight of said catalyst.

3. The process as claimed in claim 1 wherein said unsaturated fatty acid is taken from the group consisting of ricinoleic and oleic acids.

4. The process as claimed in claim 3 wherein said ricinoleic acid is supplied in the form of castor oil.

References Cited

UNITED STATES PATENTS

| 2,023,383 | 12/1935 | Scheauth et al. | 260—638 |
| 2,332,834 | 10/1943 | Schuckmann | 260—638 |
| 2,340,687 | 2/1944 | Richardson et al. | 260—638 |
| 2,375,495 | 5/1945 | Richardson et al. | 260—638 |
| 2,538,034 | 1/1951 | Peppel | 260—638 |
| 2,590,105 | 3/1952 | Kunz et al. | |

FOREIGN PATENTS

| 22,735 | 2/1962 | Germany. |

LEON ZITVER, *Primary Examiner.*

J. E. EVANS, *Assistant Examiner.*